(12) United States Patent
Strasser

(10) Patent No.: US 6,990,603 B2
(45) Date of Patent: Jan. 24, 2006

(54) METHOD AND APPARATUS FOR SECURING VOLATILE DATA IN POWER FAILURE IN SYSTEMS HAVING REDUNDANCY

(75) Inventor: Amnon A. Strasser, Tel Aviv (IL)

(73) Assignee: Exanet Inc., Santa Clara, CA (US)

( * ) Notice: Subject to any disclaimer, the term of this patent is extended or adjusted under 35 U.S.C. 154(b) by 506 days.

(21) Appl. No.: 10/032,617

(22) Filed: Jan. 2, 2002

(65) Prior Publication Data

US 2003/0126494 A1    Jul. 3, 2003

(51) Int. Cl.
*G06F 11/00*    (2006.01)

(52) U.S. Cl. .......................... 714/6; 711/133

(58) Field of Classification Search ................ 714/6, 714/5, 7, 3, 8, 13, 18, 16, 47, 42; 711/133, 711/134
See application file for complete search history.

(56) References Cited

U.S. PATENT DOCUMENTS

| | | | |
|---|---|---|---|
| 3,801,963 A | | 4/1974 | Chen |
| 4,763,333 A | * | 8/1988 | Byrd ............................ 714/22 |
| 5,414,861 A | | 5/1995 | Horning |
| 5,485,623 A | | 1/1996 | Kurokawa et al. |
| 5,621,885 A | * | 4/1997 | Del Vigna, Jr. ............... 714/13 |
| 5,742,792 A | * | 4/1998 | Yanai et al. ................. 711/162 |
| 5,822,600 A | | 10/1998 | Hallowell et al. |
| 5,835,780 A | | 11/1998 | Osaki et al. |
| 5,872,984 A | | 2/1999 | Berglund et al. |
| 6,052,797 A | * | 4/2000 | Ofek et al. ..................... 714/6 |
| 6,151,688 A | | 11/2000 | Wipfel et al. |
| 6,195,754 B1 | | 2/2001 | Jardine et al. |
| 6,336,174 B1 | * | 1/2002 | Li et al. ...................... 711/162 |
| 6,389,546 B1 | | 5/2002 | Kano et al. |
| 6,393,584 B1 | | 5/2002 | McLaren et al. |
| 6,553,408 B1 | * | 4/2003 | Merrell et al. .............. 709/213 |
| 6,571,354 B1 | * | 5/2003 | Parks et al. .................... 714/7 |
| 6,640,278 B1 | * | 10/2003 | Nolan et al. .................... 711/6 |
| 6,700,351 B2 | * | 3/2004 | Blair et al. ................. 320/125 |
| 6,775,794 B1 | * | 8/2004 | Horst et al. ................... 714/42 |

* cited by examiner

*Primary Examiner*—Nadeem Iqbal
(74) *Attorney, Agent, or Firm*—Sughrue Mion, PLLC

(57) ABSTRACT

A method and apparatus for transferring data between a main volatile memory and a backup memory in a redundant system comprised of a main sub-system and a mirror sub-system is provided. For the purpose of preserving uninterruptible power supply energy, data is continuously transferred to back-up memory which may be a corresponding volatile memory of the mirror sub-system, or a non-volatile memory of the main sub-system. The method further includes the steps of detecting a loss of system power, transferring data from volatile memory to non-volatile memory, and turning off the power supply of the non-volatile memory module. The method is capable of detecting the status of the uninterruptible power supply of the mirror system and if that system is operative then only data not previously backed up is transferred to main non-volatile memory; otherwise, if a power failure is detected in both sub-systems all data in volatile memory, not previously written to non-volatile memory is transferred to non-volatile memory.

70 Claims, 6 Drawing Sheets

METHOD AND APPARATUS FOR SECURING VOLATILE DATA IN POWER FAILURE IN SYSTEMS HAVING REDUNDANCY

BACKGROUND OF THE INVENTION

1. Field of the Invention

The present invention relates to a method and apparatus for transferring data in volatile and non-volatile redundant memory architectures, including random access and write cache architectures, and more particularly, to a method and apparatus for transferring data between a volatile memory and a non-volatile memory in a redundant storage environment.

2. Description of the Related Art

In a client/server environment, it is often required that write transactions cached by a server are kept in memory until transferred to stable storage. As this information may be critical such volatile memory modules usually require batteries or any other uninterruptible power supply for proper operation. In conventional systems, either the volatile memory module battery supplies power all the time, regardless of changes in system power, or the volatile memory module battery supplies power during an entire power failure time period.

Referring to FIG. 1, a conventional volatile memory module, including a central processing unit 1, a volatile memory 2, a non-volatile memory 3, or otherwise a main storage device 3, and an uninterruptible power supply 4 is illustrated. In the conventional module, the processing unit, the non-volatile memory and the main storage device are connected to each other. A battery or other uninterruptible power supply backs up the volatile memory. Because the battery backing up the volatile memory is not under any control, except possibly being controlled to supply power during an entire power failure time period, it remains on until the battery itself loses power or until power is restored.

Therefore, the volatile memory always remains powered up. However, the longer the battery is required to stay on before system power is restored, the more the life of the battery will be shortened. If the battery is required to maintain power for too long before system power is restored, the battery can lose power, thereby causing a loss of data stored in the volatile memory.

The concept used in the system described in FIG. 1 is used in the industry in a variety of implementations. In modem computing systems, as well as storage devices, the concept of redundancy has long been introduced. However, the concepts of reducing the hazards of data loss due to power supply failure have remained essentially the same. Systems currently available for handling power supply failures do not take advantage of the redundancy features of modem system to reduce the power requirements from the uninterruptible power supply.

SUMMARY OF THE INVENTION

The present invention has been made in view of the above circumstances and is intended to overcome the above problems and limitations of the prior art.

Additional aspects and advantages of the present invention will be set forth in part in the description that follows and in part will be obvious from the description, or may be learned by practice of the present invention. The aspects and advantages of the present invention may be realized and attained by means of the instrumentalities and combinations particularly pointed out in the appended claims.

According to a first aspect of the invention, a system with redundancy and power failure capabilities comprising a main sub-system, a mirror sub-system, a means of communication between the main sub-system and mirror sub-system and an uninterruptible power supply connected to at least one of the main sub-system or mirrored sub-system is provided. The main sub-system further comprises a main control unit, a main volatile memory and a main non-volatile memory. Similarly, the mirror sub-system also comprises a redundant control unit, a redundant volatile memory and a redundant non-volatile memory.

According to a second aspect of the invention, a method for transferring data between a main volatile memory and a backup memory in a system having a main sub-system and a mirror sub-system, each capable of being powered by an uninterruptible power supply, is provided. The method determines if a main control unit is available. If the main control unit is available, the method transfers data from a main volatile memory to a backup memory and keeps a record of which data was transferred to the backup memory. The method transfers all the data to the backup memory and terminates upon completion of the data transfer to the backup memory. If, however, the main control unit is not available, the method for transferring data between a main volatile memory and a backup memory waits until the main control unit is available.

In a third aspect of the present invention, a computer program product for enabling a system to transfer data between a volatile memory and a backup memory in a system having a main sub-system and a mirror sub-system, each capable of being powered by an uninterruptible power supply is provided. The computer program product comprises software instructions for enabling the system to perform predetermined operations and a computer readable medium bearing software instructions. The predetermined operations include determining if a main control unit is available. If the main control unit is available the predetermined operations include transferring data from a main volatile memory to a backup memory, keeping record of which data was transferred to the backup memory, repeating the above steps until all data is transferred to the backup memory and terminating upon completion of data transfer to the backup memory. If, however, the main control unit is not available, the predetermined operations wait until the main control unit is available.

In a fourth aspect of the present invention, a method for transferring data between a main volatile memory and a main non-volatile memory, in a system have a main sub-system and a mirror sub-system, each capable of being powered by an uninterruptible power supply is provided. The method further comprises determining if the voltage level in a main sub-system is less than a predetermined level. Based on that determination, if the voltage level is less than a predetermined level, a check is made to determine if the voltage level of the mirror sub-system is less than a predetermined level. Based on that determination, all data not previously backed up in the main non-volatile memory is transferred from the main volatile memory to the main non-volatile memory. Otherwise, only the data not previously transferred is transferred to the backup memory. The above mentioned sequence is then repeated until all relevant data is transferred to the main non-volatile memory. The method further comprises determining if the redundant control unit completed the transfer of data to the non-volatile memory, and based on that determination, turning off the uninterruptible power supply of the non-volatile memory module, or otherwise indicating the completion of data transfer to the main non-volatile memory.

In a fifth aspect of the invention, a computer program product for enabling a computer system to transfer data between a main volatile memory and a main non-volatile memory in a system having a main sub-system and a mirror sub-system each capable of being powered by an uninterruptible power supply is provided. The computer program product further comprises software instructions for enabling the computer system to perform predetermined operations and a computer readable medium bearing software instructions. The predetermined operations include determining if a voltage level of the main sub-system is less than a predetermined level. Based on that determination, if the voltage level is less than a predetermined level, a check is made to determine if the voltage level of the mirror sub-system is less than a predetermined level. Based on the determination, data not previously backed up in the main non-volatile memory is transferred from the main volatile memory to the main non-volatile memory. Otherwise, only the data not previously transferred is transferred to a backup memory. The above mentioned sequence is repeated until all relevant data is transferred to the main non-volatile memory. The predetermined operations further include determining if the redundant control unit completed the transfer of data to non-volatile memory and based on that determination, turning off the uninterruptible power supply of the non-volatile memory module, or otherwise indicating the completion of the data transfer to the main non-volatile memory.

BRIEF DESCRIPTION OF THE DRAWINGS

The accompanying drawings, which are incorporated in and constitute a part of this specification illustrate aspects of the invention and, together with the written description, serve to explain the aspects, advantages and principles of the invention. In the drawings.

DETAILED DESCRIPTION OF THE INVENTION

Figure 1:
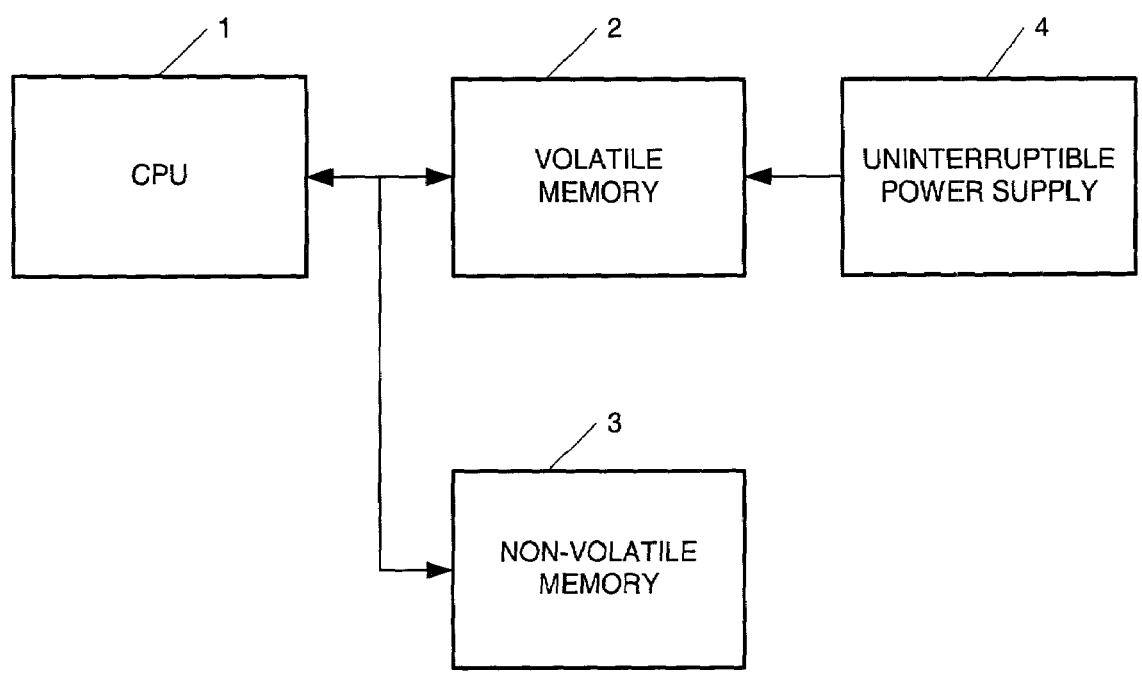
FIG. 1 illustrates a block diagram of a conventional non-volatile memory module.

Prior to describing the aspects of the invention, some details concerning the prior art will be provided to facilitate the reader's understanding of the invention and to set forth the meaning of various terms.

As used herein, the term "computer system" encompasses the widest possible meaning and includes, but is not limited to, standalone processors, networked processors, mainframe processors, and processors in a client/server relationship. The term "computer system" is to be understood to include at least a memory and a processor. In general, the memory will store, at one time or another, at least portions of executable program code, and the processor will execute one or more of the instructions included in that executable program code. The term "processor" may be used to describe a variety of devices capable of performing control and processing functions by processing a series of predefined instructions. The term may refer to microprocessors, microcontrollers, control units, and the likes. The term "volatile memory" is used for any type of memory that may lose the data stored in it upon disruption of power supply, for example, random access memory (RAM), cache memory and the likes. The term "non-volatile memory" is used for any type of memory capable of retaining data stored in it even when there is a disruption in power supply, for example, Flash memory, programmable read only memory (PROM), erasable programmable read only memory (EPROM), electrically erasable programmable read only memory (EEPROM), hard disk, diskette, compact disk (CD), digital video disk (DVD) and the likes.

It will be appreciated that the term "predetermined operations," the term "computer system software," and the term "executable code" mean substantially the same thing for the purposes of this description. It is not necessary to the practice of the present invention that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may include a diskette, a tape, a compact disc, an integrated circuit, a cartridge, a remote transmission via a communications circuit, or any other similar medium useable by computers. For example, to distribute computer system software, the supplier might provide a diskette or might transmit the instructions for performing predetermined operations in some form via satellite transmission, via a direct telephone link, or via the Internet.

Although computer system software might be "written on" a diskette, "stored in" an integrated circuit, or "carried over" a communications circuit, it will be appreciated that, for the purposes of this discussion, the computer usable medium will be referred to as "bearing" the instructions for performing predetermined operations. Thus, the term "bearing" is intended to encompass the above, and all equivalent ways, in which instructions for performing predetermined operations are associated with a computer usable medium.

Therefore, for the sake of simplicity, the term "program product" is hereafter used to refer to a computer useable medium, as defined above, which bears instructions for performing predetermined operations in any form.

A detailed description of the aspects of the invention will now be given referring to the accompanying drawings.

Figure 2:
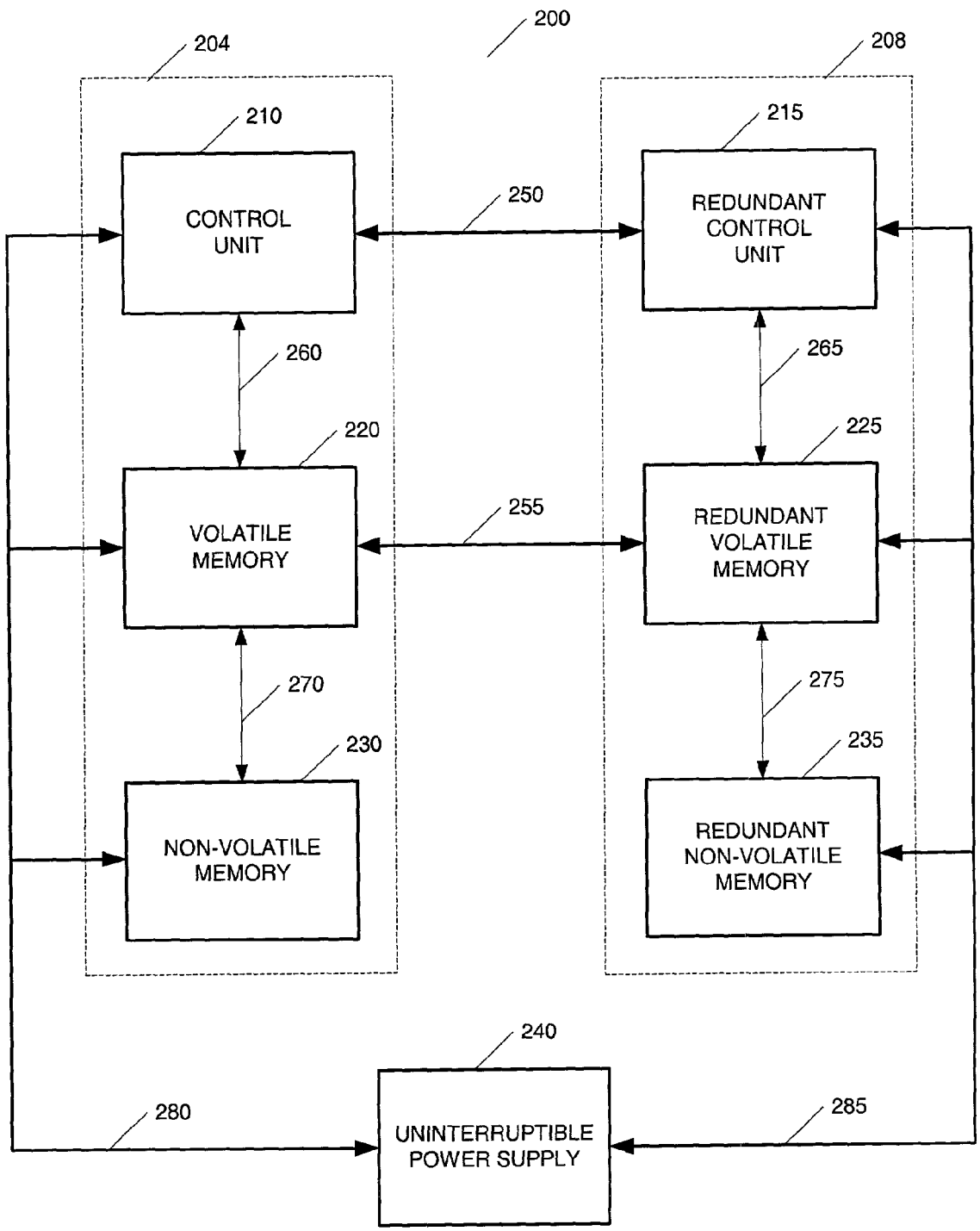
FIG. 2 illustrates an exemplary embodiment of a memory module having volatile and non-volatile memory redundancy according to the present invention.

Referring to FIG. 2, an exemplary embodiment comprising a main sub-system and a mirror sub-system, both of which are supported by memory and an uninterruptible power supply, is illustrated. A main sub-system 204 is comprised of a control unit 210, a volatile memory 220 and a non-volatile memory 230, all of which are connected together via communication links 260 and 270, respectively. In another exemplary embodiment of the present invention, communication links 260 and 270 are a combined communication link, and may include, but are not limited to, a processor bus, a peripheral component interface (PCI) network, an Infiniband network, a local area network (LAN) or a wide area network (WAN). In yet another exemplary embodiment of the present invention, communication links 260 and 270 have redundant communication links allowing for switching over from a main communication link to a redundant communication link upon a communication failure.

A mirror sub-system 208, also referred to as a redundant sub-system, is comprised of a redundant control unit 215, a redundant volatile memory 225 and a redundant non-volatile memory 235, all of which are connected together via redundant communication links 265 and 275, respectively. The redundant sub-system 208 mirrors the main sub-system 204. In an exemplary embodiment of the present invention, both the main sub-system 204 and the mirror sub-system 208 are continuously used for processing purposes. An example of such an embodiment is provided in U.S. patent application Ser. No. 09/989,375, entitled "A System and Method for Load Balancing in Systems Having Redundancy," filed Nov. 21, 2001, and which is assigned to the same common assignee as the present application, and is hereby incorporated herein by reference in its entirety for all it discloses. In another exemplary embodiment of the present invention, the communication links 265 and 275 are a single communications link, including, but not limited to, a processor bus, a peripheral component interface (PCI) network, an Infiniband network, a local area network (LAN) or a wide area network (WAN).

The control unit 210 and the redundant control unit 215 are further connected through communications link 250. The volatile memory 220 and the redundant volatile memory 225 are further connected through communications link 255. In another exemplary embodiment of the present invention, communication links 260 and 270 are a single communications link, and may include, but are not limited to, a processor bus, a peripheral component interface (PCI) network, an Infiniband network, a local area network (LAN) or a wide area network (WAN).

An uninterruptible power supply 240 is connected to and supplies power to the control unit 210 and the redundant control unit 215, the volatile memory 220 and the redundant volatile memory 225, and the non-volatile memory 230 and the redundant non-volatile memory 235 through the connectivity links 280 and 285, respectively.

In another exemplary embodiment of the present invention, a microcontroller, which controls the data transfer between the volatile memory 220 and the non-volatile memory 230, is embedded in the non-volatile memory 220. Similarly, a microcontroller may be embedded in non-volatile memory 235.

Upon power loss, power from the uninterruptible power supply 240 can be used to transfer data stored in volatile memory 220 onto the non-volatile memory 230. Similarly, the process can be mirrored on the redundant volatile memory 225 and non-volatile memory 235 respectively. When the transfer operation is completed, uninterruptible power supply power 240 is no longer required to maintain the data stored in the non-volatile memory; hence, the power can optionally be disconnected to prolong the life, or "on" time, of uninterruptible power supply 240. A person skilled in the art could easily implement system 200 using multiple uninterruptible power supplies, each supplying power to a specific element of the main sub-system or the mirror sub-system. More specifically, it should be noted that system 200 can be implemented as a geographically distributed system.

In yet another exemplary embodiment of the present invention, the volatile memory and/or the non-volatile memory may be comprised of one or more volatile or non-volatile devices, respectively. The uninterruptible power supply may be commanded to shut down power to each volatile and/or non-volatile device to which sustaining power is no longer required. For example, a volatile memory device, from which all data has been transferred to a redundant volatile memory or to a non-volatile memory, may be disconnected from uninterruptible power supply. Similarly, a non-volatile memory, to which no data is to be transferred, may be similarly disconnected from the uninterruptible power supply. In yet another exemplary embodiment, if power supply is restored during the backup operation, then only data that was actually corrupted during the shutdown process, e.g., a volatile memory device being disconnected from uninterruptible power supply, is restored from the non-volatile memory or from the redundant volatile memory, hence saving time to bring the system up and running.

Figure 3:
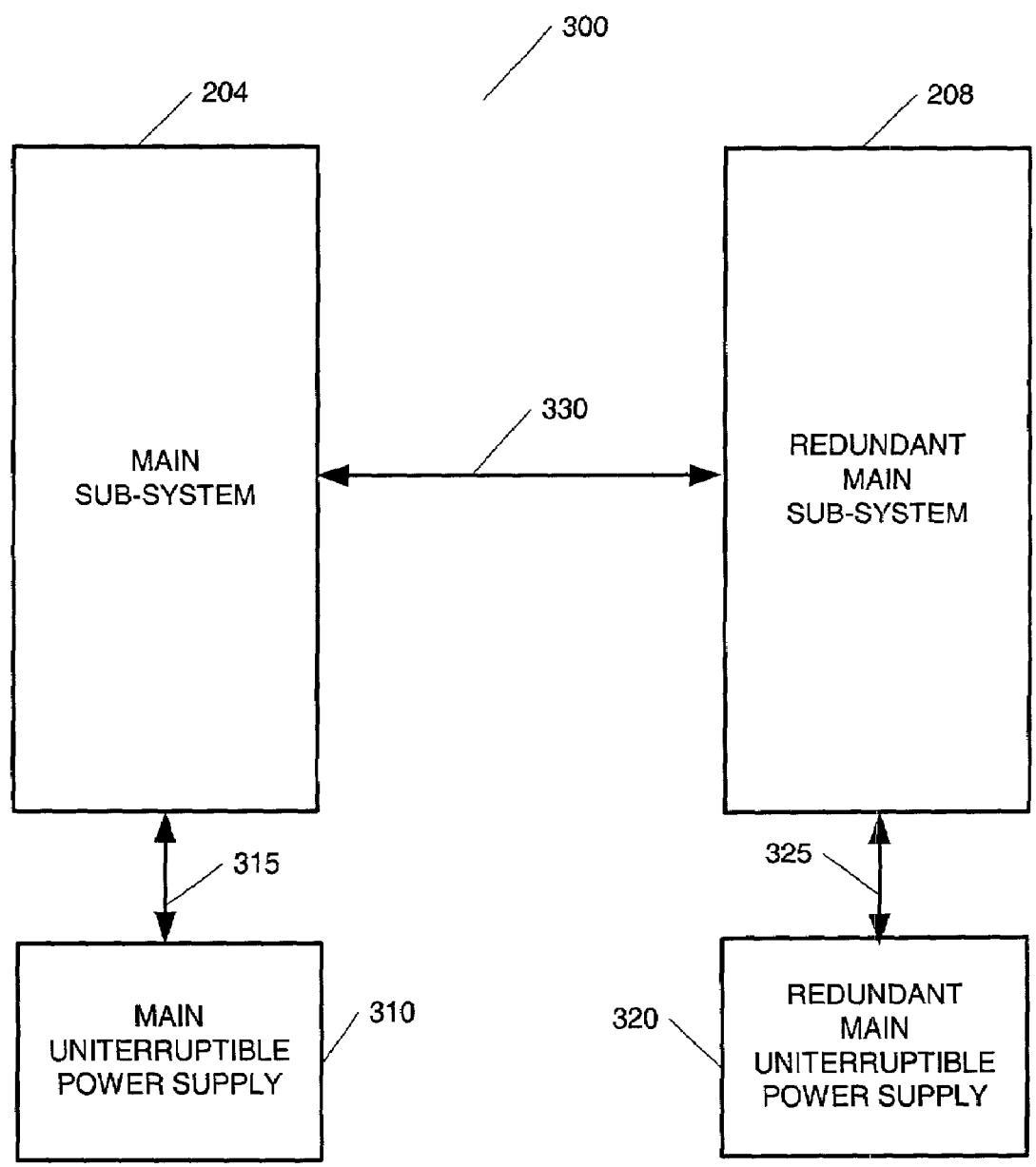
FIG. 3 illustrates another exemplary embodiment of a distributed main sub-system and mirror sub-system each having its separate uninterruptible power supply units according to the present invention.

Referring to FIG. 3, another aspect of the present invention is illustrated, which is similar to FIG. 2, except that in FIG. 3, the main sub-system 204 and the redundant sub-system 208 are connected by a communication link 330, through which control and data information is transferred back and forth. Specifically, this exemplary embodiment is particularly suitable for geographically distributed systems where the communication link may be, but is not limited to, a local area network (LAN), a wide area network (WAN), or an asynchronous transfer mode (ATM) network. The main sub-system 204 is connected to uninterruptible power supply 310 and the redundant sub-system 208 is connected redundant uninterruptible power supply 320, respectively. The uninterruptible power supply 310 and the redundant uninterruptible power supply 320 may be controlled via communication link 330 by the redundant control unit 215 and the main control unit 210, respectively. Periodically, data is transferred from the main volatile memory to the redundant volatile memory or to the main non-volatile memory, as explained above. Upon detection of power loss, activities described above are performed; however, each of the uninterruptible power supplies is controlled separately. When the transfer operation is completed, uninterruptible power supply power is no longer required to maintain the data stored in the non-volatile memories. Thus, the power can optionally be disconnected to either one or both of the uninterruptible power supply 310 and the redundant uninterruptible power supply 320, in order to prolong the uninterruptible power supply life.

Figure 4:
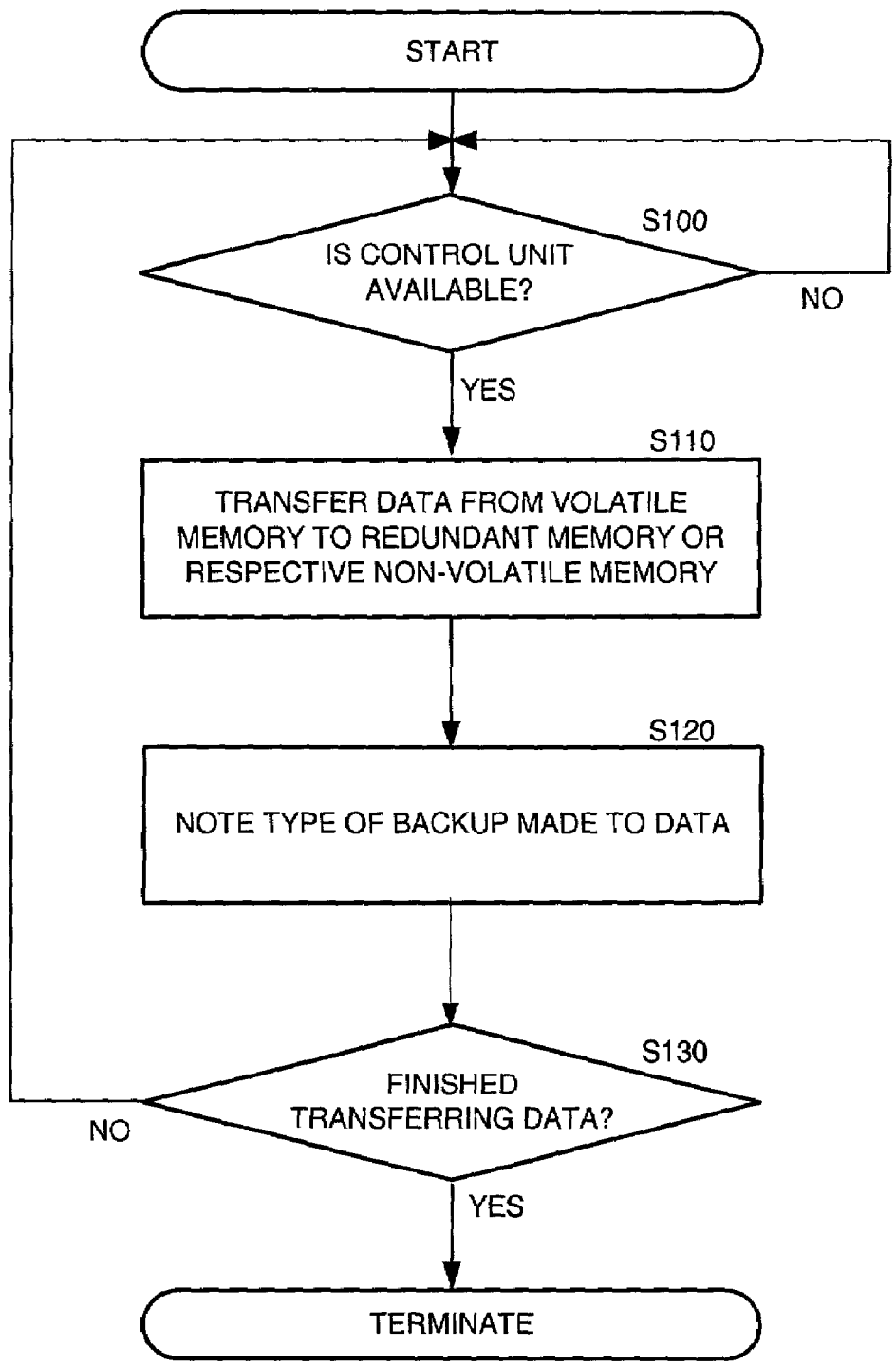
FIG. 4 illustrates a flow chart of a method of transferring data from non-volatile memory to stable storage according to the present invention.

In a system having redundancy, it is further possible to allow for a longer "life-time" for uninterruptible power supply 240. This is achieved by taking advantage of the redundant features of system 200. FIG. 4 illustrates a method of transferring data, according to an aspect of the present invention. At S100, the method determines whether a control unit (control unit 210 or redundant control unit 215, as the case may be) is available, i.e., control unit is not busy with other system or user tasks. If the control unit is not available, the method returns to S100. If the control unit is available, at S110, data is transferred from the volatile memory to a redundant volatile memory or to a non-volatile memory. Specifically, the system may choose to transfer data from the volatile memory 220 to the volatile memory 225, which is the redundant memory of the mirror sub-system 208. The system may otherwise choose to transfer data to the non-volatile memory 230. Thus, at S110, data is transferred from the volatile memory (volatile memory 220 or redundant volatile memory 225, as the case may be) to a backup memory. Determination of the location of backup may be based on one or more of the following parameters: a priority determination, a sensitivity to failure determination, a random algorithm, a round robin algorithm, a weighted round robin algorithm, a least recently used algorithm, a space availability determination or network load balancing determination. A priority determination may assign a higher priority to backing up frequently used information on the local non-volatile memory rather then transferring it over the communication link to the redundant system. A sensitivity to failure determination may be the amount of damage that can occur to the system in the case where certain data was not backed up properly. If the damage is high then it may be beneficial to move the data to the redundant system so as to ensure the data integrity in the case where the main system has a significant failure. A space availability determination may be used when it is essential to keep certain data in a specific memory, for example main non-volatile memory and therefore as this memory fills up it is required to maintain space there for the expected data that must be stored in that memory. In other cases more random approaches may be used as the importance is in having some kind of a non-volatile backup but it is not critical were the data resides. By using one of the random or semi-random approaches suggested the data to be backed up will be spread between the various types of memories and the goal of maintaining a high level of data integrity is achieved. At S120, data that was backed up in either one of the above listed methods is recorded as having been backed up. If not all the data has been transferred at S130, then the process continues at step S100, otherwise the process is complete. It should be noted that this process might be repeated periodically for the purpose of backing up additional data not previously backed up by the system. Uninterruptible power supply "life," or "on time," is prolonged as there will be less data to be backed up in case of power failure. This method can be equally applied on system 300 described in FIG. 3. A person skilled in the art could further add the step of ceasing the operation based on this method upon detection of power failure.

Figure 5A:
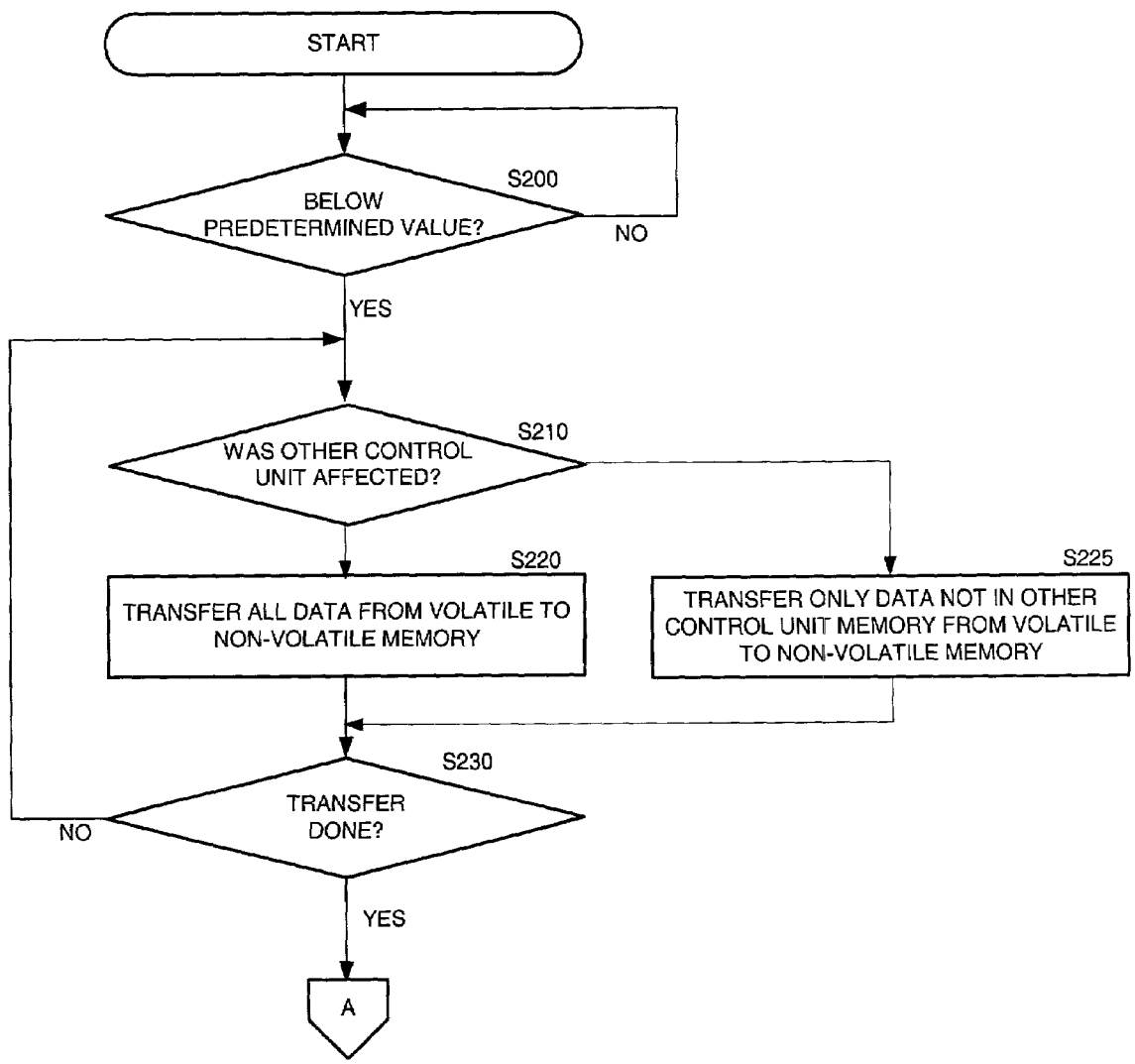
FIGS. 5A and 5B illustrate a flow chart of a method of transferring data from volatile to non-volatile memory in a system having redundancy according to the present invention.
Figure 5B:
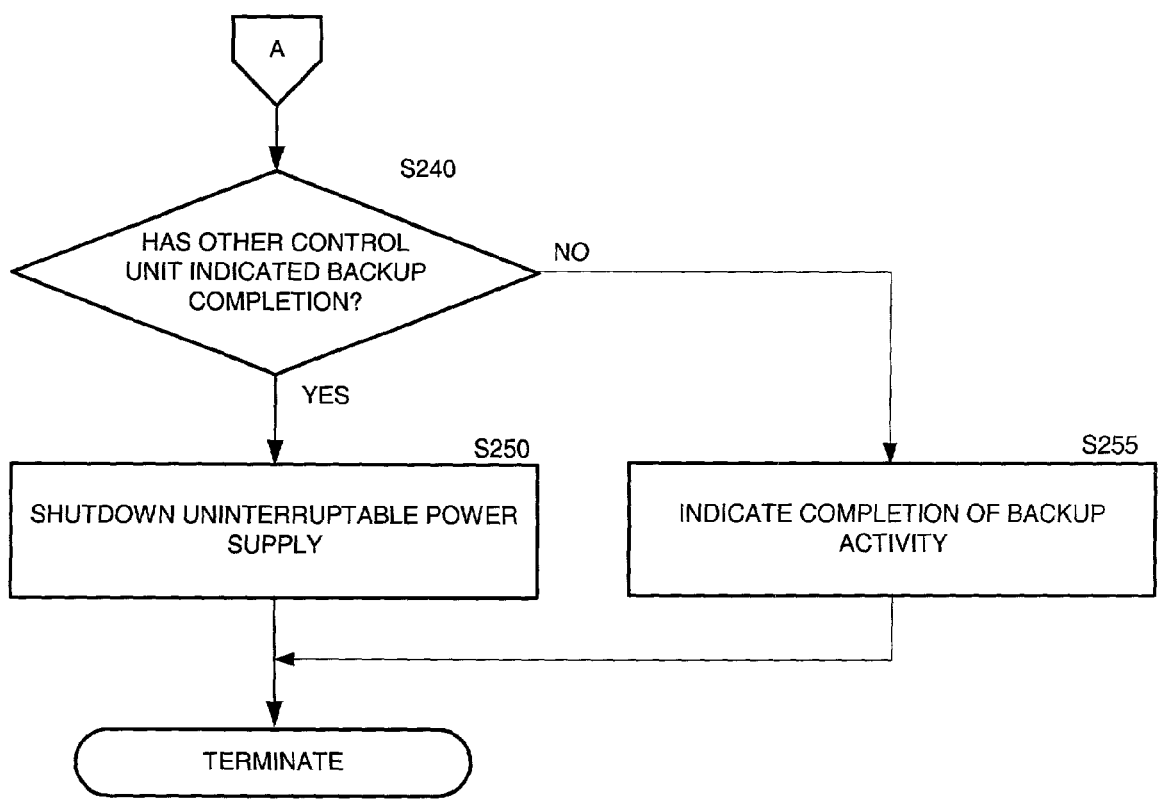

FIGS. 5A and 5B illustrate a method of transferring data, according to another aspect of the present invention. Referring to FIG. 5A, at S200, it is determined if system power is below a predetermined level. If system power is not below the predetermined level, the method returns to S200. If system power is below the predetermined level, then at S210, a check is performed to determine if the other control unit of the mirror sub-system 208 was affected. If both the main control unit and the redundant control unit were affected, then in S220, all data is transferred from the volatile memories (volatile memory 220 or redundant volatile memory 225) to the non-volatile memories (non-volatile memory 230 or non-volatile memory 235). However, if the other control unit was not affected, then at S225, only data not previously transferred to the volatile memory of the mirror sub-system 208 is transferred to the non-volatile memories (non-volatile memory 230 or non-volatile memory 235). In S230, it is determined if the data transfer from volatile memory to non-volatile memory is complete. If all the data has not been transferred yet, the method returns to S210. In another exemplary embodiment of the present invention, control is returned to S200 instead of S210. This is advantageous in the case where the power failure was only temporary and there is no need to continue the backup process. Otherwise the method continuation is described in FIG. 5B.

Referring to FIG. 5B, it is determined in S240 if the other control unit has indicated backup completion. If the other control unit has not indicated backup completion, then at S255, the control unit indicates that it has concluded the backup activity and terminates further backup activity. If both the control unit and the redundant control unit have completed the backup activity, then at S250, the last control unit to complete the backup activity shuts down uninterruptible power supply 240. With this method, power can be saved by: a) continuously backing up data to either redundant volatile memory or to non-volatile memory; b) backing up only data which may be affected by a power failure; and c) shutting off uninterruptible power supply upon completion of backup activity.

According to another aspect of the present invention, there is provided a computer program product, in which programs for backing up data in a system having redundancy as well as power-fail response capabilities is described. The computer program product comprises software instructions for enabling the computer system to perform predetermined operations, and a computer readable medium bearing the software instructions. The predetermined operations of the computer program product determine if a control unit is available to execute these predetermined instructions. If the control unit is unavailable then the program waits until such time when control unit is available. When control unit is available, portions of data, not previously backed up, are backed up on either a redundant volatile memory or on non-volatile memory. If all previously not backed up data has been backed up, then the program terminates, otherwise, it continues its operation until such time that all data has been backed up. Determination of the location of backup may be based on one or more of the following parameters: a priority determination, a sensitivity to failure determination, a random algorithm, a round robin algorithm, a weighted round robin algorithm, a least recently used algorithm, a space availability determination or network load balancing determination.

According to another aspect of the present invention, there is provided a computer program product, in which programs for detecting a loss of system power, writing data from a volatile memory to a non-volatile memory, and turning off the power supply of a system having redundancy as well as power-fail response capabilities, by computers, are recorded in order to enable a computer system to transfer data between a volatile memory and a non-volatile memory. The computer program product comprises software instructions for enabling the computer system to perform predetermined operations, and a computer readable medium bearing the software instructions. The predetermined operations of the computer program product determine if a voltage level of the computer system is less than a predetermined level. Based on that determination, if the voltage level is less than a predetermined level, the program further checks if both control unit and redundant control unit have been affected. If both control units have been affected then the predetermined operations flush all data from the volatile memory to the non-volatile memory. However, if only the control unit has been affected by the power failure then only data not transferred to the redundant volatile memory is flushed from the volatile memory to the non-volatile memory. The predetermined level that is used is a voltage level appropriate for the application. Typically, this voltage level will be non-zero. The computer program product also comprises predetermined operations that turn off the uninterruptible power supply if both control units have indicated completion of their respective backup activities.

The computer program product also detects a restoration of system power to the non-volatile memory module and potentially turning on the uninterruptible power supply. The predetermined operations of the computer program product determine if the voltage level of the computer system is above the predetermined level following a shutdown of the uninterruptible power supply. As before, the predetermined level is the voltage level that is appropriate for the application. Based on determining if the voltage level is above the predetermined level, the computer program product includes predetermined operations that turn on the uninterruptible power supply if the voltage level is above the predetermined level.

The computer program product further includes predetermined operations that transfer the data that was previously transferred into the non-volatile memory to of its respective location in volatile memory. A voltage level being above a predetermined level triggers the data transfer. The voltage level being above a predetermined level assumes that the voltage level had previously dropped below that predetermined level and data was transferred to the non-volatile memory. First, the predetermined operations can transfer the data back to the volatile memory. Second, the predetermined operations can transfer the data from the non-volatile memory to a main storage device. Third, the predetermined operations can transfer the data from the storage device to a processing unit memory.

The foregoing description of the aspects of the invention has been presented for purposes of illustration and description. It is not intended to be exhaustive or to limit the invention to the precise form disclosed, and modifications and variations are possible in light of the above teachings or may be acquired from practice of the invention. The principles of the invention and its practical application were described in order to explain the invention to enable one skilled in the art to utilize the invention in various embodiments and with various modifications as are suited to the particular use contemplated.

Thus, while only certain aspects of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A computer system comprising:
    a main sub-system comprising a main control unit, a main volatile memory, and a main updateable non-volatile memory;
    a mirror sub-system comprising a redundant control unit, a redundant volatile memory, and a redundant updateable non-volatile memory;
    a communication link coupled between said main sub-system and said mirror sub-system;
    an uninterruptible power supply connected to said main sub-system and said mirror sub-system; and
    means for tracking data not previously copied to said non-volatile memory or to said mirror sub-system, wherein, upon the detection of a power supply failure to said main sub-system, only data in said main volatile memory not previously copied to said non-volatile memory or to said mirror sub-system is copied to said main updateable non-volatile memory.

2. The system of claim 1, wherein said main sub-system is capable of functioning as a mirror sub-system.

3. The system of claim 1, wherein said mirror sub-system is capable of functioning as a main sub-system.

4. The system of claim 1, wherein a controller is embedded in the memory device.

5. The system of claim 4, wherein said controller is a disk controller.

6. The system of claim 1, wherein said main sub-system further comprises a first communications link enabling communication between said main control unit and said main volatile memory.

7. The system of claim 6, wherein said main sub-system further comprises a second communications link enabling communication between said main volatile memory and said main updateable non-volatile memory.

8. The system of claim 7, wherein said second communications link is a redundant communications link.

9. The system of claim 7, wherein said first communications link and said second communications link comprise a single communications link.

10. The system of claim 9, wherein said single communications link is partially connected to said communications link between said main sub-system and said mirror sub-system.

11. The system of claim 6, wherein said first communications link is a processor bus, a peripheral component interface (PCI) network, an Infiniband network, a local area network (LAN) or a wide area network (WAN).

12. The system of claim 1, wherein said communications link is a processor bus, a peripheral component interface (PCI) network, an Infiniband network, a local area network (LAN) or a wide area network (WAN).

13. The system of claim 1, wherein said uninterruptible power supply is a battery.

14. The system of claim 1, wherein said main sub-system and said mirror sub-system is each connected to its own uninterruptible power supply, respectively.

15. The system of claim 14, wherein said uninterruptible power supplies are capable of exchanging status information.

16. The system of claim 1, wherein said communications link comprises a first communications link coupled between said main control unit and said redundant control unit, and second communications link between coupled between said main volatile memory and said redundant volatile memory.

17. The system of claim 1, wherein said control unit is a processor, a microprocessor, a controller, a microcontroller or a computer.

18. The system of claim 1, wherein said volatile memory is a random access memory (RAM) or a cache memory.

19. The system of claim 1, wherein said updateable non-volatile memory is a flash memory, a programmable read only memory (PROM), an erasable programmable read only memory (EPROM), an electrically erasable programmable read only memory (EEPROM), a hard disk, a diskette, a compact disk (CD) or a digital video disk (DVD).

20. The system of claim 1, wherein said main control unit periodically stores data from said main volatile memory to a backup memory.

21. The system of claim 20, wherein said backup memory is said main updateable non-volatile memory or said redundant volatile memory.

22. The system of claim 21, wherein said backup memory is selected based on a priority determination, a sensitivity to failure determination, a random algorithm, a round robin algorithm, a weighted round robin algorithm, a least recently used algorithm, a space availability determination or network load balancing determination.

23. The system of claim 1, wherein said main control unit transfers data from said main volatile memory into said main updateable non-volatile memory when said main control unit determines that an external voltage level is less than a predetermined level.

24. The system of claim 23, wherein prior to transferring said data said control unit checks for power failure of said redundant control unit.

25. The system of claim 1, wherein said control unit transfers data previously transferred into said main non-volatile memory or into said redundant volatile memory to said main updateable volatile memory when said control unit determines that an external voltage level exceeds a predetermined level.

26. The system of claim 25, wherein data is transferred from said updateable non-volatile memory or said redundant volatile memory to said main volatile memory, the content of which has been corrupted.

27. The system of claim 1, wherein said main volatile memory further comprises a plurality of volatile memory devices.

28. The system of claim 1, wherein said main updateable non-volatile memory further comprises a plurality of non-volatile memory devices.

29. The system claim 1, wherein said main control unit sequentially shuts off the power to said main updateable volatile memory or said main non-volatile memory after data transfer has been completed.

30. The system of claim 1, wherein said system is a computer system.

31. The system of claim 30, wherein said computer system is a network of computers.

32. A method for transferring data between a main volatile memory and updateable backup memory in a system having a main sub-system and a mirror sub-system, each powered by an uninterruptible power supply, the method comprising:
determining if a main control unit is available, and otherwise waiting until said main control unit is available;
transferring data from said main volatile memory to said updateable backup memory when said control unit is available;
keeping record of which data was not transferred to said updateable backup memory; and
causing the data transfer of only the data indicated in said record to said updateable backup memory upon the detection of power failure in said uninterruptible power supply.

33. The method of claim 32, wherein said updateable backup memory is a main non-volatile memory or a redundant volatile memory.

34. The method of claim 32, wherein said main non-volatile memory is a flash memory, a programmable read only memory (PROM), an erasable programmable read only memory (EPROM), an electrically erasable programmable read only memory (EEPROM), a hard disk, a diskette, a compact disk (CD) or a digital video disk (DVD).

35. The method of claim 33, wherein said main non-volatile memory is comprised of one or more non-volatile memory devices.

36. The method of claim 32, wherein said main volatile memory is a random access memory (RAM) or a cache memory.

37. The method of claim 32, wherein said main volatile memory is comprised of one or more volatile memory devices.

38. A computer program product for enabling a system to transfer data between volatile memory and updateable backup memory in a system having a main sub-system and a mirror sub-system, each powered by an uninterruptible power supply, the computer program product comprising:
software instructions for enabling said system to perform predetermined operations, and a computer readable storage medium bearing the software instructions;
the predetermined operations comprising:
determining if a main control unit is available, or otherwise waiting until said main control unit is available;
transferring data from said main volatile memory to said updateable backup memory;
keeping record of which data was not transferred to said updateable backup memory; and
causing the data transfer of only the data indicated in said record to said updateable backup memory upon the detection of power failure in said uninterruptible power supply.

39. The computer program product of claim 38, wherein said updateable backup memory is a main non-volatile memory or a redundant volatile memory.

40. The computer program product of claim 38, wherein said main non-volatile memory is a flash memory, a programmable read only memory (PROM), an erasable programmable read only memory (EPROM), an electrically erasable programmable read only memory (EEPROM), a hard disk, a diskette, a compact disk (CD) or a digital video disk (DVD).

41. The computer program product of claim 38, wherein said main non-volatile memory is comprised of one or more non-volatile memory devices.

42. The computer program product of claim 38, wherein said main volatile memory is a random access memory (RAM) or a cache memory.

43. The computer program product of claim 38, wherein said main volatile memory is comprised of one or more volatile memory devices.

44. The computer program product of claim 38, wherein said predetermined operations further comprise ceasing data transfer upon detection of power failure.

45. The computer program product of claim 38, wherein said system is a computer system.

46. The computer program product of claim 45, wherein said computer system is at least a network of computers.

47. A method for transferring data between a main volatile memory and a main updateable non-volatile memory in a system having a main sub-system and a mirror sub-system, each capable of being powered by an uninterruptible power supply, comprising:
determining if the voltage level of the main sub-system is less than a predetermined level;
based on that determination, if the voltage level is less than a predetermined level, checking if the voltage level of the mirror sub-system is less than a predetermined level;
based on that determination transferring all data not previously backed up in said main updateable non-volatile memory from said main volatile memory to said main non-volatile memory, or otherwise transferring only data not previously transferred to a backup memory;
determining if said redundant control unit completed transfer of data to said main updateable non-volatile memory; and
based on that determination, turning off the uninterruptible power supply, connected to said main non-volatile memory module, or otherwise indicating the completion of data transfer to said main non-volatile memory.

48. The method of claim 47, wherein said uninruptible power supply and the uninterruptible power supply of said mirror sub-system function independently of each other.

49. The method of claim 47, wherein said main volatile memory is a random access memory (RAM) or a cache memory.

50. The method of claim 47, wherein said main volatile memory comprises one or more volatile memory devices.

51. The method of claim 47, wherein said main updateable non-volatile memory is a flash memory, a programmable read only memory (PROM), an erasable programmable read only memory (EPROM), an electrically erasable programmable read only memory (EEPROM), a hard disk, a diskette, a compact disk (CD) or a digital video disk (DVD).

52. The method of claim 47, wherein said main updateable non-volatile memory comprises one or more non-volatile memory devices.

53. The method of claim 47, wherein said transfer of data from said main volatile memory to said updateable non-volatile memory ceases upon detection of voltage level above said predetermined level.

54. The method of claim 47, wherein said system is a computer system.

55. The method of claim 54, wherein said computer system is at least a network of computers.

56. The method of claim 47, wherein the method further comprises:
 determining if the voltage level of the system is above the predetermined level following a shutdown of the uninterruptible power supply; and
 based on that determination, turning on the uninterruptible power supply if the voltage level is above the predetermined level.

57. The method of claim 56, wherein the method further comprises transferring the data that was transferred into said updateable non-volatile memory to back to said volatile memory if the voltage level is above the predetermined level.

58. The method of claim 56, wherein the method further comprises transferring the data that was transferred into said updateable non-volatile memory to said volatile memory of said main sub-system if the voltage level is above the predetermined level.

59. A computer program product for enabling a computer system to transfer data between a main volatile memory and a main updateable non-volatile memory in a system having a main sub-system and a mirror sub-system, each powered by an uninterruptible power supply, the computer program product comprising:
 software instructions for enabling the computer system to perform predetermined operations, and a computer readable storage medium bearing the software instructions;
 the predetermined operations comprising:
  determining if a voltage level of the main sub-system is less than a predetermined level;
  based on that determination, if the voltage level is less than a predetermined level, checking if the voltage level of the mirror sub-system is less than a predetermined level;
  based on that determination transferring all data not previously backed up in said main updateable non-volatile memory from said main volatile memory to said main non-volatile memory, or otherwise transferring only data not previously transferred to a backup memory;
  determining if said redundant control unit completed transfer of data to non-volatile memory; and
  based on that determination, turning off the uninterruptible power supply of the non-volatile memory module, or otherwise indicating the completion of data transfer to said main non-volatile memory.

60. The computer program product of claim 59, wherein said uninterruptible power supply comprises an uninterruptible power supply of said main sub-system and an uninterruptible power supply of said mirror sub-system that are capable of functioning independently of each other.

61. The computer program product of claim 59, wherein said main volatile memory is a random access memory (RAM) or a cache memory.

62. The computer program product of claim 59, wherein said main volatile memory comprises one or more volatile memory devices.

63. The computer program product of claim 59, wherein said main updateable non-volatile memory is a flash memory, a programmable read only memory (PROM), an erasable programmable read only memory (EPROM), an electrically erasable programmable read only memory (EEPROM), a hard disk, a diskette, a compact disk (CD) or a digital video disk (DVD).

64. The computer program product of claim 59, wherein said main updateable non-volatile memory comprises one or more non-volatile memory devices.

65. The computer program product of claim 59, wherein said transfer of data from said main volatile memory to said updateable non-volatile memory ceases upon detection of voltage level above said predetermined level.

66. The computer program product of claim 59, wherein said system is a computer system.

67. The computer program product of claim 59, wherein said computer system is at least a network of computers.

68. The computer program product of claim 59, wherein said predetermined operations further comprise:
 determining if the voltage level of the system is above the predetermined level following a shutdown of the uninterruptible power supply; and
 based on that determination, turning on the uninterruptible power supply if the voltage level is above the predetermined level.

69. The computer program product of claim 59, wherein said predetermined operations further comprise transferring the data that was transferred into said updateable non-volatile memory back to said volatile memory if the voltage level is above the predetermined level.

70. The computer program product of claim 59, wherein said predetermined operations further comprise transferring the data that was transferred into said updateable non-volatile memory to said volatile memory of said main sub-system if the voltage level is above the predetermined level.

* * * * *